(12) United States Patent
Poertzgen et al.

(10) Patent No.: US 6,431,330 B1
(45) Date of Patent: Aug. 13, 2002

(54) BRAKE ARRANGEMENT FOR A LAND VEHICLE

(75) Inventors: Gregor Poertzgen, Koblenz; Karl-Friedrich Wörsdorfer, Budenheim; Ralf Erben, Kemmenau; Guido Zenzen, Macken, all of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/551,890

(22) Filed: Apr. 19, 2000

Related U.S. Application Data

(63) Continuation of application No. PCT/EP98/06850, filed on Oct. 29, 1998.

(30) Foreign Application Priority Data

Oct. 31, 1997 (DE) .......................................... 197 48 318

(51) Int. Cl.⁷ .............................................. F16D 65/21
(52) U.S. Cl. ...................................... 188/156; 188/162
(58) Field of Search ................................. 188/156, 157, 188/162

(56) References Cited

U.S. PATENT DOCUMENTS

| | | | |
|---|---|---|---|
| 4,809,824 A | 3/1989 | Fargier et al. ............... | 188/156 |
| 4,836,338 A | 6/1989 | Taig ............................ | 188/156 |
| 4,877,113 A | 10/1989 | Taig ............................ | 188/156 |
| 5,024,299 A | 6/1991 | Shaw et al. ................. | 188/156 |
| 5,348,123 A | 9/1994 | Takahashi et al. .......... | 188/156 |
| 5,829,845 A | 11/1998 | Maron et al. ............... | 188/156 |
| 6,056,090 A * | 5/2000 | Reimann et al. ............ | 188/156 |
| 6,153,988 A * | 11/2000 | Reimann et al. ............ | 188/156 |
| 6,179,097 B1 * | 1/2001 | Schumann .................. | 188/162 |

FOREIGN PATENT DOCUMENTS

| | | |
|---|---|---|
| DE | 3423510 | 1/1986 |
| DE | 4312524 | 10/1994 |
| DE | 29614738 | 12/1996 |
| DE | 19611910 | 10/1997 |
| WO | 97/36117 | * 10/1997 |

* cited by examiner

*Primary Examiner*—Matthew C. Graham
(74) *Attorney, Agent, or Firm*—MacMillan, Sobanski and Todd, LLC

(57) ABSTRACT

The invention relates to a brake arrangement for a land vehicle comprising the following characteristics: an electric motor with a downstream connected (reduction) gear which acts on the friction pads of a brake arrangement, with the gear being designed self-locking, and an actuation mechanism by means of which the self-locking function can be cancelled or established.

16 Claims, 1 Drawing Sheet

BRAKE ARRANGEMENT FOR A LAND VEHICLE

This application is a continuation of PCT/EP98/06850, filed Oct. 29, 1998.

BACKGROUND OF THE INVENTION

The present invention relates to a brake arrangement for a land vehicle. In particular, the present invention relates to a brake arrangement for a land vehicle, in which the brake arrangement can be actuated electrically. In such brake arrangements which are also referred to as "brake-by-wire" arrangements, there exists the problem of performing the release and application movements of the friction elements with high dynamics relative to the brake disk or the brake drum. This applies in particular during the driving operation of the land vehicle. In addition, high application forces are to be exerted in order to ensure a substantial deceleration of the land vehicle.

Moreover, there is the necessity to provide a parking brake function during standstill of the land vehicle, which prevents the vehicle from automatically starting to move on slopes.

Between the service brake function and the parking brake function exists the contradictory requirement that a parking brake must be self-locking while a service brake must not be self-locking. For this reason, the parking brake function in brake-by-wire arrangements has up to now been realised separately from the service brake function. Among others, this requires considerable installation space and is cost-intensive.

SUMMARY OF THE INVENTION

The present invention is based on the object to provide a brake arrangement in which the parking brake function and the service brake function are integrated in an actuator unit for the friction elements, which simultaneously ensures that the service brake can by no means come into the self-locking condition.

This object is solved by the vehicle brake described in the following.

BRIEF DESCRIPTION OF THE DRAWINGS

FIG. 1 shows an actuator unit of a vehicle brake system, which acts upon the brake disk 10 of a wheel 12 (not to scale) non-rotatably connected with the brake disk via a shaft 14. The brake disk is accommodated between two friction pads 16a, 16b.

DETAILED DESCRIPTION OF THE PREFERRED EMBODIMENT

Figure 1:
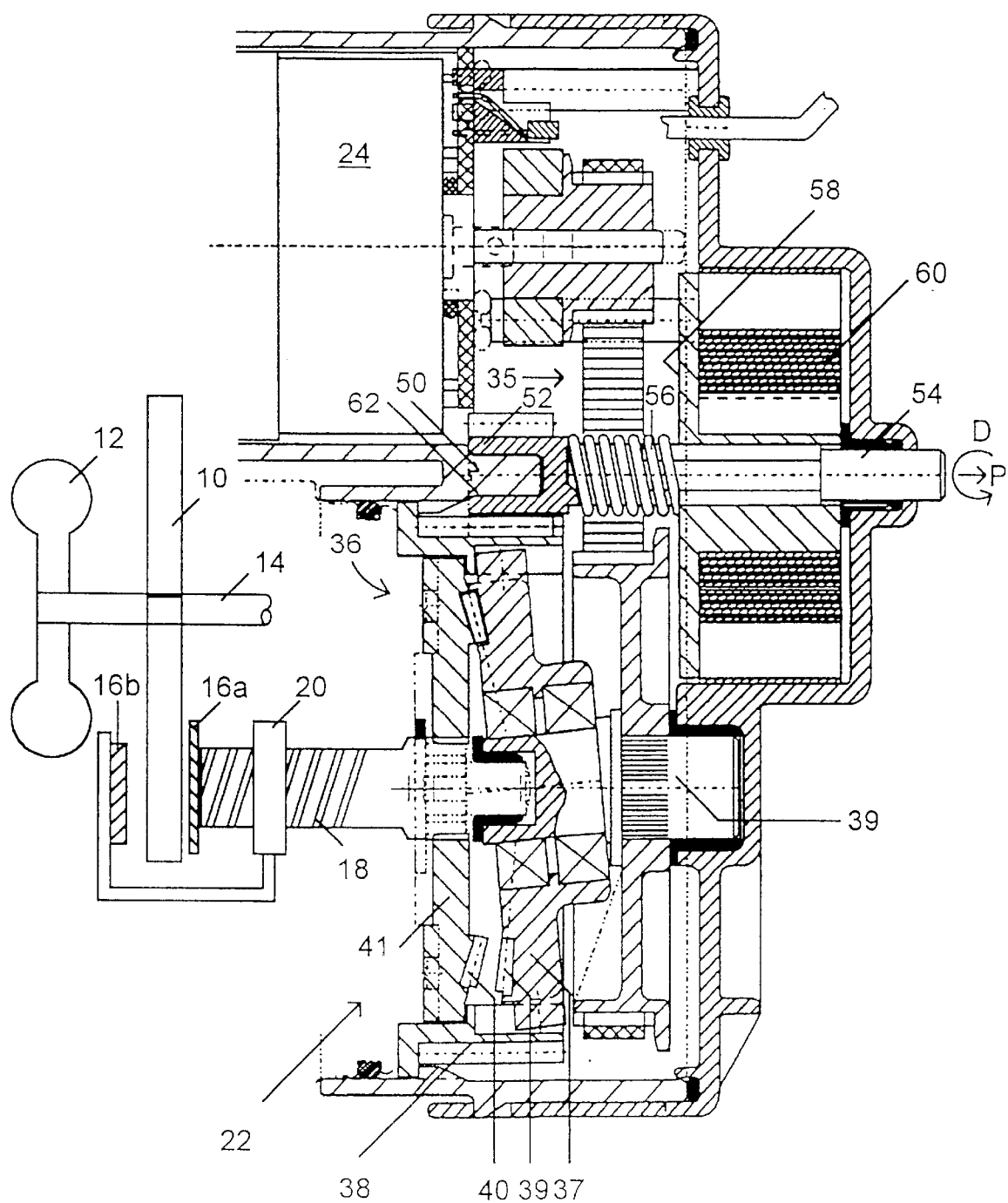
FIG. 1 shows an actuator unit of a vehicle brake system in accordance with the present invention.

The release or application movement, respectively, of the friction pads 16a, 16b relative to the brake disk 10 is effected via a spindle (18)/nut (20) arrangement. Depending on the sense of rotation of an electric motor 24, the spindle 18 is brought into an application or release rotation by said electric motor 24 via a gear arrangement 22 described in detail below. The control of the electric motor is effected in a manner not explained in detail as a function of an electric control signal which depends on the pedal position of the brake pedal of the land vehicle or on an actuation of a parking brake lever, respectively.

In a preferred manner, the gear arrangement 22 which is designed as a reduction gear has an overall reduction of 200:1 and is a two-stage design. This results in a compact actuator unit, wherein primarily the electric motor 24 can be selected to be of a small size and nevertheless be able to exert a sufficiently high clamping force. For this purpose, via a first reduction stage of 4:1 designed as a toothed belt gear 35, the electric motor 24 drives a swash plate mechanism 36 which provides a second reduction stage of 50:1. The swash plate mechanism 36 comprises a swash ring 37 which is non-rotatably accommodated in an outer supporting ring 38 and abuts the drive shaft 39 at a chamfered end so that the rotational movement of the drive shaft 39 brings the swash ring 37 into a wobble motion. The swash ring 37 comprises a spur toothing 39 which is in engagement with the spur toothing of an output ring 41, with the output ring 41 being non-positively connected with the spindle 18 acting as an output shaft. With the outer supporting ring 38 being stationary, the wobble motion of the swash ring 37 causes the consecutive other teeth of the spur toothing 39 of the swash ring 37 to come into engagement with the spur toothing 40 of the output ring 41. Due to the fact that the number of teeth Z1 of the spur toothing of the output ring 41 is selected lower than the number of teeth Z2 of the swash ring 37, a relative rotational movement of the output ring 41 with respect to the stationary supporting ring 38 results, which has an opposite sense of rotation to that of the drive shaft 39. Thus, a rotation of the output ring 41 by the difference in the teeth numbers of the spur toothing of the swash ring 37 and the output ring 41 results. If, for example, the output ring 41 has the tooth number Z1=98 and the swash ring 37 has the tooth number Z2=100, the reduction i of 50:1 resulting therefrom is obtained according to the formula i=Z2/(Z1−Z2).

For the second reduction stage, either a gear mechanism known as "Cyclo gear mechanism" or a gear mechanism known as "Harmonic drive system" which, among others, is known from DE 296 14 738 U1 can be employed in lieu of the swash plate mechanism. This gear type, too, comprises a stationary supporting ring, the input and output senses of rotation are opposite to each other as well, with the reduction being determined from the difference in the numbers of teeth or circumferential length, respectively, of a non-rotable versus a rotatable ring.

"Cyclo gear mechanisms" are characterised by their extremely high torque capacity, a very high efficiency, high possible gear ratios and up to a five-fold overload capability which has a favourable effect for overcoming a possibly required break-away torque at the spindle/nut arrangement. "Cyclo gear mechanisms" are eccentric gear mechanisms whose gear outer profile describes a cycloid characteristic. A disk is driven via an eccentric element and rolls around in a ring. If the disk is provided with a closed cycloid characteristic and the ring replaced by pins arranged in a circle, a positive connection is achieved thereby. A "cyclo gear mechanism" has three moving main components, the drive shaft with the eccentric element, the cam disks, and the output shaft. The double eccentric element rotates with drive speed and drives two cam disks which are offset to each other by 180° via roller bearings. Thus, the cam disks simultaneously rotate about two different axes. Rotation with reduced speed in the opposite direction is generated. With a full revolution of the eccentric element, each cam disk revolves by a cam section. Generally, the cam disk has one tooth less than the pins provided in the pin ring. In these cases, the gear ratio is determined by the number of cam sections of a cam disk. For the transmission of the reduced rotation movement to the output shaft, the cam disks are provided with holes arranged in a circle. The output shaft has a coaxial driver disk on which driver pins arranged in a circle are located which engage into the corresponding holes in the cam disk. The driver pins and the outer pins are fitted with rollers which provide for a purely rolling force transmission between the cam disks and the driver pins of the output shaft.

Both a swash plate mechanism and a harmonic drive mechanism enable reduction ratios of up to 320:1. Therefore, the first reduction stage can be omitted for achieving a reduction of 200:1. For example, a serial arrangement of electric motor and gear mechanism would then be preferred instead of the parallel arrangement of electric motor and gear mechanism, with the electric motor directly driving gear drive shaft.

It is essential for a swash plate mechanism and for the the gear mechanism known from DE 296 14 738 U1 that the gear mechanism in reverse rotation is self-locking, which means no force counteracting the drive, however high it may be, is able to rotate the drive shaft in the reverse direction. It also means, however, that the drive shaft can be changed in the one or the other direction.

Due to the fact that the spindle/nut arrangement 18/20 is designed self-locking, the position obtained upon clamping of the spindle/nut arrangement 18/20 is maintained even after switching off the electric motor 24.

As described above, the supporting ring 38 is non-rotatable in the rest position of the arrangement. By means of the configuration described below it is possible to achieve a reverse rotation and thus a release movement of the friction pads 16a, 16b (via the spindle/nut arrangement 18, 20), even with the swash plate mechanism virtually at standstill.

At a bearing journal 50 a pinion is arranged rotatably and also axially slidably in the direction of arrow P, which meshes with an outer toothing of the supporting ring 38. This pinion 52 is rigidly connected with a tension rod 54. The pinion 52 is biased in the opposite direction of arrow P by means of a coil spring 56 against a wall 58 which is wound about the tension bar 54. Moreover, a helical spring 60 is wound about the tension bar 54, which acts as torsion spring accumulator.

At the bottom of the bearing journal 50 a saw toothing is formed so that upon an axial movement of the tension bar 54 in the direction of arrow P, the charged spring accumulator 60 can bring the pinion 52 into rotation in the sense of rotation D. In the engaged condition of the pinion 52 (loaded by the coil spring 56), the saw toothing causes the pinion 52 to be not rotatable. In the normal case, the supporting ring 38 is therefore non-rotatable.

The brake arrangement functions as follows:

Upon supplying the electric motor 24 with current, the spindle/nut arrangement 18, 20 is brought into rotation via the gear arrangement so that the friction pads 16a, 16b perform an application movement towards the brake disk 10.

In the opposite current supply of the electric motor 24, the spindle/nut arrangement 18, 20 is brought into a reverse rotation via the gear arrangement so that the friction pads 16a, 16b perform a release movement away from the brake disk 10.

If the tension bar 54 is operated in the direction of arrow P, the pinion 52 clears the saw toothing at the bottom of the bearing journal, so that the tension bar 54 is brought into rotation by means of the charged spring accumulator 60. The consequence of this is that the pinion 52 which is rigidly connected with the tension bar 54 brings the supporting ring 38 into rotation. This causes a rotational movement of the spindle 18 so that the nut 20 moves the friction pads 16a, 16b away from the brake disk 10. The last described process takes place in the case of a release of the parking brake or upon an emergency actuation. Thus, the parking brake function can be released even without electrical actuation.

For charging the spring accumulator 60 the tension bar 54 (e.g. electromagnetically operated) is moved in the direction of arrow P, and simultaneously the electric motor 24 is activated. In this manner, the supporting ring 38 starts to rotate and thereby drives the pinion in the opposite sense of rotation, whereby the spindle/nut arrangement reaches a stop, for example, in that the friction pads come into contact with the brake disk. The consequence of this is that the torque applied by the electric motor is utilised to tighten the spring accumulator 60 in the sense of an energy storage.

What is claimed is:

1. A brake arrangement for a land vehicle comprising:
    an electric motor operatively connected to a reduction gear having an output operatively connected with an input of a release/application apparatus which is adapted to act upon friction pads of the brake arrangement; and
    an actuation mechanism being provided by means of which a self-locking function of said reduction gear can be cancelled or established as well as an opening movement of said release/application apparatus in order that a clearance of the friction pads from a brake disc can be performed.

2. The brake arrangement for a land vehicle according to claim 1, wherein said actuation mechanism is in said self-locking function with the land vehicle being immobilised and said electric motor being currentless.

3. The brake arrangement for a land vehicle according to claim 2 wherein said self-locking function is cancelled with said actuation mechanism being operated, and for said opening movement a driving force is provided from an energy accumulator.

4. The brake arrangement for a land vehicle according to claim 3 wherein a charging of said energy accumulator is effected by an activation of said electric motor under normal operating conditions.

5. The brake arrangement for a land vehicle according to claim 3 wherein said energy accumulator is a spring accumulator.

6. The brake arrangement for a land vehicle according to claim 5 wherein said spring accumulator acts rotatably on said gear mechanism.

7. The brake arrangement for a land vehicle according to claim 5 wherein said spring accumulator acts rotatably and translatorily on said gear mechanism.

8. The brake arrangement for a land vehicle according to claim 1 wherein said self-locking function is cancelled with said actuation mechanism being operated, and for said opening movement a driving force is provided from an energy accumulator.

9. The brake arrangement for a land vehicle according to claim 8, wherein a charging of said energy accumulator is effected by an activation of said electric motor under normal operating conditions.

10. A brake arrangement for a land vehicle comprising:
    an electric motor operatively connected to a reduction gear having an output operatively connected with an input of a release/application apparatus which is adapted to act upon friction pads of the brake arrangement; and
    an actuation mechanism being provided by means of which a self-locking function of said reduction gear can be cancelled or established as well as an opening movement of said release/application apparatus in order that a clearance of the friction pads from a brake disc can be performed;

wherein said self-locking function is cancelled with said actuation mechanism being operated, and for said opening movement a driving force is provided from an energy accumulator, wherein said energy accumulator is a spring accumulator.

11. The brake arrangement for a land vehicle according to claim 10 wherein said spring accumulator acts rotatably on said gear mechanism.

12. The brake arrangement for a land vehicle according to claim 10 wherein said spring accumulator acts rotatably and translatorily on said gear mechanism.

13. The brake arrangement for a land vehicle according to claim 10 wherein said actuation mechanism is in said self-locking function with the land vehicle being immobilised and said electric motor being currentless.

14. The brake arrangement for a-land vehicle according to claim 10 wherein a charging of said energy accumulator is effected by an activation of said electric motor under normal operating conditions.

15. The brake arrangement for a land vehicle according to claim 10 wherein said spring accumulator acts rotatably on said gear mechanism.

16. The brake arrangement for a land vehicle according to claim 10 wherein said spring accumulator acts rotatably and translatorily on said gear mechanism.

* * * * *